United States Patent
Freedman et al.

(10) Patent No.: US 9,586,370 B2
(45) Date of Patent: Mar. 7, 2017

(54) METHOD FOR MAKING ULTRA HIGH MOLECULAR WEIGHT POLYETHYLENE

(71) Applicant: Biomet Manufacturing, LLC, Warsaw, IN (US)

(72) Inventors: Jordan H. Freedman, Fort Wayne, IN (US); David W. Schroeder, Winona Lake, IN (US)

(73) Assignee: Biomet Manufacturing, LLC, Warsaw, IN (US)

( * ) Notice: Subject to any disclaimer, the term of this patent is extended or adjusted under 35 U.S.C. 154(b) by 581 days.

(21) Appl. No.: 14/052,347

(22) Filed: Oct. 11, 2013

(65) Prior Publication Data
US 2015/0048537 A1 Feb. 19, 2015

Related U.S. Application Data

(60) Provisional application No. 61/866,452, filed on Aug. 15, 2013.

(51) Int. Cl.
*B29C 71/02* (2006.01)
*B29B 13/02* (2006.01)
(Continued)

(52) U.S. Cl.
CPC .............. *B29C 71/02* (2013.01); *B29B 13/02* (2013.01); *B29C 35/0227* (2013.01); *B29C 47/0004* (2013.01); *B29C 47/0071* (2013.01); *C08J 7/08* (2013.01); *B29C 2035/085* (2013.01); *B29C 2035/0844* (2013.01); *B29C 2035/0877* (2013.01); *B29C 2071/022* (2013.01); *B29K 2023/0683* (2013.01); *B29K 2105/253* (2013.01); *B29K 2105/255* (2013.01);
(Continued)

(58) Field of Classification Search
None
See application file for complete search history.

(56) References Cited

U.S. PATENT DOCUMENTS 2,948,666 A 8/1960 Lawton
3,362,897 A 1/1968 Lawton
(Continued)

FOREIGN PATENT DOCUMENTS

CA 1257745 A1 7/1989
DE 19914571 A1 1/2001
(Continued)

OTHER PUBLICATIONS

Appleby et al. "Post-Gamma Irradiation Cross-linking of Polyethylene Tape by Acetylene Treatment" Journal of Materials Science. vol. 29 (1994) p. 227-231.
(Continued)

*Primary Examiner* — Benjamin Schiffman
(74) *Attorney, Agent, or Firm* — Schwegman Lundberg & Woessner, P.A.

(57) ABSTRACT

Heat treating UHMWPE by applying pressure with radial constraint at suitable times during a heating protocol reduces or eliminates cavitation, which is otherwise observed to occur when the UHMWPE is heated to a temperature above 300° C. Heat treated UHMWPE can undergo subsequent processing involving crosslinking, deformation, doping with antioxidant, and homogenizing or annealing. Heating during these steps can be carried out even above the onset melt temperature of the UHMWPE without loss of physical properties.

28 Claims, 1 Drawing Sheet

(51) Int. Cl.
*B29C 35/02* (2006.01)
*B29C 47/00* (2006.01)
*B29K 23/00* (2006.01)
*B29K 105/00* (2006.01)
*B29L 31/06* (2006.01)
*B29C 35/08* (2006.01)

(52) U.S. Cl.
CPC ............... *B29K 2995/0094* (2013.01); *B29K 2995/0096* (2013.01); *B29L 2031/06* (2013.01)

(56) References Cited

U.S. PATENT DOCUMENTS

| | | |
|---|---|---|
| 3,563,870 A | 2/1971 | Tung et al. |
| 3,886,056 A | 5/1975 | Kitamaru et al. |
| 3,956,253 A | 5/1976 | Braun |
| 4,027,080 A | 5/1977 | Amtmann et al. |
| 4,055,862 A | 11/1977 | Farling |
| 4,171,338 A | 10/1979 | Mason |
| 4,224,696 A | 9/1980 | Murray et al. |
| 4,265,959 A | 5/1981 | Sano et al. |
| 4,281,420 A | 8/1981 | Raab |
| 4,348,350 A | 9/1982 | Meier et al. |
| 4,390,666 A | 6/1983 | Moriguchi et al. |
| 4,582,656 A | 4/1986 | Hoffmann |
| 4,586,995 A | 5/1986 | Randall et al. |
| 4,587,163 A | 5/1986 | Zachariades |
| 4,636,340 A | 1/1987 | Itaba et al. |
| 4,655,769 A | 4/1987 | Zachariades |
| 4,668,577 A | 5/1987 | Ohta et al. |
| 4,747,990 A | 5/1988 | Gaussens et al. |
| 4,778,633 A | 10/1988 | Kiang et al. |
| 4,820,468 A | 4/1989 | Hartig |
| 4,857,247 A | 8/1989 | Raczkowski |
| 4,902,460 A | 2/1990 | Yagi et al. |
| 4,938,913 A | 7/1990 | Ward et al. |
| 5,030,402 A | 7/1991 | Zachariades |
| 5,030,487 A | 7/1991 | Rosenzweig |
| 5,037,928 A | 8/1991 | Li et al. |
| 5,066,755 A | 11/1991 | Lemstra |
| 5,096,654 A | 3/1992 | Craggs et al. |
| 5,130,376 A | 7/1992 | Shih |
| 5,160,464 A | 11/1992 | Ward et al. |
| 5,169,589 A | 12/1992 | Francoeur et al. |
| 5,200,129 A | 4/1993 | Kobayashi et al. |
| 5,200,439 A | 4/1993 | Asanuma |
| 5,204,045 A | 4/1993 | Courval et al. |
| 5,210,130 A | 5/1993 | Howard, Jr. |
| 5,234,652 A | 8/1993 | Woodhams et al. |
| 5,266,246 A | 11/1993 | Johnson et al. |
| 5,276,079 A | 1/1994 | Duan et al. |
| 5,358,529 A | 10/1994 | Davidson |
| 5,405,393 A | 4/1995 | Falkenstrom |
| 5,407,623 A | 4/1995 | Zachariades et al. |
| 5,414,049 A | 5/1995 | Sun et al. |
| 5,428,079 A | 6/1995 | Bastiaansen et al. |
| 5,439,949 A | 8/1995 | Lucas et al. |
| 5,449,745 A | 9/1995 | Sun et al. |
| 5,466,530 A | 11/1995 | England et al. |
| 5,478,906 A | 12/1995 | Howard, Jr. |
| 5,505,900 A | 4/1996 | Suwanda et al. |
| 5,508,319 A | 4/1996 | DeNicola, Jr. et al. |
| 5,543,471 A | 8/1996 | Sun et al. |
| 5,552,104 A | 9/1996 | DeNicola, Jr. et al. |
| 5,577,368 A | 11/1996 | Hamilton et al. |
| 5,650,485 A | 7/1997 | Sun et al. |
| 5,684,124 A | 11/1997 | Howard, Jr. et al. |
| 5,709,020 A | 1/1998 | Pienkowski et al. |
| 5,728,748 A | 3/1998 | Sun et al. |
| 5,824,411 A | 10/1998 | Shalaby et al. |
| 5,827,904 A | 10/1998 | Hahn |
| 5,830,396 A | 11/1998 | Higgins et al. |
| 5,879,400 A | 3/1999 | Merrill et al. |
| 6,017,975 A | 1/2000 | Saum et al. |
| 6,048,480 A | 4/2000 | Doyle |
| 6,051,487 A | 4/2000 | Gardner et al. |
| 6,143,232 A | 11/2000 | Rohr |
| 6,146,426 A | 11/2000 | Doyle |
| 6,165,220 A | 12/2000 | McKellop et al. |
| 6,168,626 B1 | 1/2001 | Hyon et al. |
| 6,174,934 B1 | 1/2001 | Sun et al. |
| 6,184,265 B1 | 2/2001 | Hamilton et al. |
| 6,228,900 B1 | 5/2001 | Shen et al. |
| 6,242,507 B1 | 6/2001 | Saum et al. |
| 6,245,276 B1 | 6/2001 | McNulty et al. |
| 6,281,264 B1 | 8/2001 | Salovey et al. |
| 6,316,158 B1 | 11/2001 | Saum et al. |
| 6,355,215 B1 | 3/2002 | Poggie et al. |
| 6,365,089 B1 | 4/2002 | Krebs et al. |
| 6,372,814 B1 | 4/2002 | Sun et al. |
| 6,395,799 B1 | 5/2002 | Johnson |
| 6,432,349 B1 | 8/2002 | Pletcher et al. |
| 6,433,120 B1 | 8/2002 | Rastogi et al. |
| 6,448,315 B1 | 9/2002 | Lidgren et al. |
| 6,458,727 B1 | 10/2002 | Jones et al. |
| 6,464,926 B1 | 10/2002 | Merrill et al. |
| 6,494,917 B1 | 12/2002 | McKellop et al. |
| 6,503,439 B1 | 1/2003 | Burstein |
| 6,547,828 B2 | 4/2003 | Scott et al. |
| 6,562,540 B2 | 5/2003 | Saum et al. |
| 6,641,617 B1 | 11/2003 | Merrill et al. |
| 6,664,308 B2 | 12/2003 | Sun et al. |
| 6,686,437 B2 | 2/2004 | Buchman et al. |
| 6,692,679 B1 | 2/2004 | McNulty et al. |
| 6,709,464 B2 | 3/2004 | Scott et al. |
| 6,726,727 B2 | 4/2004 | Scott et al. |
| 6,786,933 B2 | 9/2004 | Merrill et al. |
| 6,800,670 B2 | 10/2004 | Shen et al. |
| 6,818,020 B2 | 11/2004 | Sun et al. |
| 6,818,172 B2 | 11/2004 | King et al. |
| 6,852,772 B2 | 2/2005 | Muratoglu et al. |
| 6,905,511 B2 | 6/2005 | Wang et al. |
| 7,214,764 B2 | 5/2007 | King |
| 7,268,039 B2 | 9/2007 | Fishburn et al. |
| 7,344,672 B2 | 3/2008 | Schroeder et al. |
| 7,431,874 B2 | 10/2008 | Muratoglu et al. |
| 7,462,318 B2 | 12/2008 | Schroeder et al. |
| 7,498,365 B2 | 3/2009 | Muratoglu et al. |
| 7,517,919 B2 | 4/2009 | Wang et al. |
| 7,547,405 B2 | 6/2009 | Schroeder et al. |
| 7,635,725 B2 | 12/2009 | Bellare et al. |
| 7,780,896 B2 | 8/2010 | Schroeder et al. |
| 7,927,536 B2 | 4/2011 | Schroeder et al. |
| 7,993,401 B2 | 8/2011 | Schroeder et al. |
| 8,137,608 B2 | 3/2012 | Schroeder et al. |
| 8,247,696 B2 | 8/2012 | Smedberg et al. |
| 8,344,040 B2 | 1/2013 | Sun |
| 8,398,913 B2 | 3/2013 | Schroeder et al. |
| 8,399,535 B2 | 3/2013 | Pletcher |
| 2001/0049401 A1 | 12/2001 | Salovey et al. |
| 2002/0007219 A1 | 1/2002 | Merrill et al. |
| 2002/0037944 A1 | 3/2002 | Shen et al. |
| 2002/0125614 A1 | 9/2002 | King et al. |
| 2002/0156536 A1 | 10/2002 | Harris et al. |
| 2003/0013781 A1 | 1/2003 | Merrill et al. |
| 2003/0045603 A1 | 3/2003 | Salovey et al. |
| 2003/0105182 A1 | 6/2003 | Merrill et al. |
| 2003/0119935 A1 | 6/2003 | Merrill et al. |
| 2003/0125513 A1 | 7/2003 | King |
| 2003/0130743 A1 | 7/2003 | Scott et al. |
| 2003/0137081 A1 | 7/2003 | Pitkanen |
| 2003/0139555 A1 | 7/2003 | Hubbard et al. |
| 2003/0144741 A1 | 7/2003 | King et al. |
| 2003/0149125 A1 | 8/2003 | Muratoglu et al. |
| 2003/0158287 A1 | 8/2003 | Salovey et al. |
| 2003/0208278 A1 | 11/2003 | Richard |
| 2003/0212161 A1 | 11/2003 | McKellop et al. |
| 2003/0229155 A1 | 12/2003 | Wang et al. |
| 2004/0051213 A1 | 3/2004 | Muratoglu |
| 2004/0132856 A1 | 7/2004 | Merrill et al. |
| 2004/0208841 A1 | 10/2004 | Salovey et al. |
| 2004/0265165 A1 | 12/2004 | King |
| 2004/0266902 A1 | 12/2004 | Shen et al. |
| 2005/0006821 A1 | 1/2005 | Merrill et al. |

(56) References Cited

U.S. PATENT DOCUMENTS

| | | |
|---|---|---|
| 2005/0010288 A1 | 1/2005 | Merrill et al. |
| 2005/0043431 A1 | 2/2005 | Wang et al. |
| 2005/0043815 A1 | 2/2005 | King et al. |
| 2005/0048096 A1 | 3/2005 | Shen et al. |
| 2005/0056971 A1 | 3/2005 | Merrill et al. |
| 2005/0059750 A1 | 3/2005 | Sun et al. |
| 2005/0069696 A1 | 3/2005 | King et al. |
| 2005/0096749 A1 | 5/2005 | Marrill et al. |
| 2005/0165495 A1 | 7/2005 | Merrill et al. |
| 2005/0194723 A1 | 9/2005 | Muratoglu et al. |
| 2006/0149387 A1 | 7/2006 | Smith et al. |
| 2006/0149388 A1 | 7/2006 | Smith et al. |
| 2006/0155383 A1 | 7/2006 | Smith et al. |
| 2006/0223905 A1 | 10/2006 | Mimnaugh et al. |
| 2006/0264541 A1 | 11/2006 | Lederer et al. |
| 2007/0114702 A1 | 5/2007 | Muratoglu et al. |
| 2007/0265369 A1 | 11/2007 | Muratoglu et al. |
| 2007/0267030 A1 | 11/2007 | Muratoglu et al. |
| 2007/0275030 A1 | 11/2007 | Muratoglu et al. |
| 2008/0036111 A1 | 2/2008 | Sun |
| 2008/0067724 A1 | 3/2008 | Muratoglu et al. |
| 2008/0090934 A1 | 4/2008 | Muratoglu et al. |
| 2008/0119582 A1 | 5/2008 | Muratoglu et al. |
| 2008/0140196 A1 | 6/2008 | Schroeder et al. |
| 2008/0214692 A1 | 9/2008 | Muratoglu et al. |
| 2008/0215142 A1 | 9/2008 | Muratoglu et al. |
| 2008/0274161 A1 | 11/2008 | Muratoglu et al. |
| 2009/0030524 A1 | 1/2009 | Schroeder et al. |
| 2009/0054545 A1 | 2/2009 | Muratoglu et al. |
| 2009/0224428 A1 | 9/2009 | Schroeder et al. |
| 2010/0108357 A1 | 5/2010 | Smedberg et al. |
| 2010/0298945 A1 | 11/2010 | Schroeder et al. |
| 2012/0041094 A1 | 2/2012 | Oral et al. |
| 2012/0046380 A1 | 2/2012 | Morrison et al. |
| 2012/0178843 A1 | 7/2012 | Sun |
| 2012/0267819 A1 | 10/2012 | Freedman |

FOREIGN PATENT DOCUMENTS

| | | |
|---|---|---|
| EP | 0729981 B1 | 3/2002 |
| EP | 1334993 A2 | 8/2003 |
| GB | 1281956 A | 7/1972 |
| JP | 52-006761 | 7/1975 |
| JP | 57-211347 A | 12/1982 |
| JP | 62216723 A | 9/1987 |
| JP | 62-243634 | 10/1987 |
| JP | 02-175137 | 7/1990 |
| JP | 08-012771 | 1/1996 |
| JP | 09141729 A | 6/1997 |
| JP | 10166468 A | 6/1998 |
| JP | 10-313435 | 11/1998 |
| JP | 11-60791 | 3/1999 |
| JP | 11077778 A | 3/1999 |
| JP | 11-239611 | 9/1999 |
| JP | 04-198201 B2 | 12/2008 |
| JP | 05-057748 B2 | 10/2012 |
| WO | 93/10953 A1 | 6/1993 |
| WO | 95/06148 A1 | 3/1995 |
| WO | 98/01085 A1 | 1/1998 |
| WO | 98/14223 A1 | 4/1998 |
| WO | 03/049930 A1 | 6/2003 |
| WO | WO-2015023931 A2 | 2/2015 |

OTHER PUBLICATIONS

Appleby et al. "Property Modification of Polyethylene Tapes by Acetylene-Sensitized Gamma Irradiation" Journal of Materials Science. vol. 29 (1994) p. 151-156.

Bhateja et al. "Radiation-Induced Crystallinity Changes in Polyethylene Blends" Journal of Materials Science. vol. 20 (1985) p. 2839-2845.

Bhateja, S. "Radiation-Induced Crystallinity Changes in Linear Polyethylene" Journal of Polymer Science: Polymer Physics Edition. vol. 21 (1983) p. 523-536.

Bhateja, S. "Radiation-Induced Crystallinity Changes in Linear Polyethylene: Influence of Aging" Journal of Applied Polymer Science. vol. 28 (1983) p. 861-872.

Bhateja, S. "Radiation-Induced Crystallinity Changes in Pressure-Crystallized Ultrahigh Molecular Weight Polyethylene" J. Macromol. Sci. Phys. B22(1) (1983) p. 159-168.

Bowman, J. "The Processing and Properties of ?-irradiated HDPE Granules" Intern. Polymer Processing III. (1988) p. 211-220.

Chen et al. "Radiation-Induced Crosslinking: II. Effect on the Crystalline and Amorphous Densities of Polyethylene" Colloid Polym Sci. vol. 269 (1991) p. 469-476.

Chen et al. "Radiation-Induced Crosslinking: III. Effect on the Crystalline and Amorphous Density Fluctuations of Polyethylene" Colloid Polym Sci. vol. 269 (1991) p. 353-363.

Choudhury et al. "The Effects of Irradiation and Ageing on the Abrasive Wear Resistance of Ultra High Molecular Weight Polyethylene" Wear Elsevier Science. vol. 203-204 (1997) p. 335-340.

Chu et al. "Some Structures and Properties of Very High Molecular Weight Linear Polyethylene" Bull. Inst. Chem. Res. vol. 47, No. 3 (1969) p. 209-221.

Collier et al. "Polyethylene: The Past, Present and Future" The American Academy of Orthopaedic Surgeons, 1999 Annual Meeting Scientific Program, available at http://www.aaos.org/wordhtml/anmeet99/sciprog/g.htm. (20 pages).

Crugnola et al., Ultrahigh Molecular Weight Polyethylene as Used in Articular Prostheses (A Molecular Weight Distribution Study), J. of App. Polymer Science, vol. 20, (1976) pp. 809-812.

Deng, et al. "Effects of Gamma Radiation on Tensile Properties of UHMW Polyethylene" The 20th Annual Meeting of the Society for Biomaterials, Boston, MA, Apr. 1994 (1 page).

Dharmastiti et al. "The Wear of Oriented UHMWPE Under Isotropically Rough and Scratched Counterface Test Conditions" Bio-Medical Materials and Engineering. vol. 11 (2001) p. 241-256.

Dijkstra et al. "Cross-linking of Ultra-high Molecular Weight Polyethylene in the Melt by Means of Electron Beam Irradiation" Polymer. vol. 30 (May 1989) p. 866-873.

Dole et al. "Crystallinity and Crosslinking Efficiency in the Irradiation of Polyethylene" Radiat. Phys. Chem. vol. 14 (1979) p. 711-720.

du Plessis et al. "The Improvement of Polyethylene Prostheses Through Radiation Crosslinking" Radiat. Phys. Chem. vol. 9 (1977) p. 647-652.

Ellis et al., The Use of Ultrahigh Molecular Weight Polyethylene in Articular Prostheses—II. Effects of Fabrication and Gamma Sterilization on Polymer Characteristics, Coatings and Plastics Preprints, vol. 37, No. 2, American Chemical Society, (1977) pp. 280-284.

Ellwanger et al. "Very High Pressure Molding of Ultra High Molecular Weight Polyethylene (UHMWPE)" ANTEC. (1987) p. 572-574.

Gauvin et al., "Investigation of the Radio Frequency Heating Process for UHMWPE" ANTEC. (1987) p. 575-578.

Greenwald et al., New Polys for Old: Contribution or Caveat?, American Academy of Orthopaedic Surgeons, 69th Annual Meeting (Feb. 13-17, 2002) (6 pages).

Hamilton, et al. "Anisotropic Properties in Ultrahigh Molecular Weight Polyethylene After Cobalt-60 Irradiation" Chapter 6 from Clough, et al. "Irradiation of Polymers" ACS Symposium Series; American Chemical Society, Washington DC, 1996.

Handlos, V. "Enhanced Crosslinking of Polyethylene" Radiat. Phys. Chem. vol. 14 (1979) p. 721-728.

Howmedica, Material Properties, Product Quality Control, and Their Relation to UHMWPE Performance, Part Two of a Series on Ultra-High Molecular Weight Polyethylene, (1994) pp. 1-20.

Howmedica, Overview and Fundamentals of UHMWPE, Part One of a Series on Ultra-High Molecular Weight Polyethylene, (1994) pp. 1-8.

Huang, H. "Mechanical Anisotropy of Self-Reinforced Polyethylene Crystallized During Continuous-Melt Extrusion," Journal of Materials Science Letters 18 (1999), pp. 225-228.

(56) References Cited

OTHER PUBLICATIONS

Jahan et al. "Combined Chemical and Mechanical Effects on Free Radicals in UHMWPE Joints During Implantation" Journal of Biomedical Materials Research. vol. 25 (1991) p. 1005-1017.

Jones et al., Effect of ? Irradiation on the Friction and Wear of Ultrahigh Molecular weight Polyethylene, Wear, vol. 70, (1981) pp. 77-92.

Josefsson et al. "Molecular Orientation of Crosslinked Polyethylene" Annual Technical Conference—Society of Plastics Engineers, 58th vol. 2 (2000) p. 1725-1729.

Kang et al. "The Radiation Chemistry of Polyethylene IX. Temperaure Coefficient of Cross-Linking and Other Effects" Journal of the American Chemical Society. vol. 89:9 (1967) p. 1980-1986.

Kanig, G. "Further Electron Microscope Observations on Polyethylene III. Smectic Intermediate State During Melting and Crystallization" Colloid Polym Sci. vol. 269 (1991) p. 1118-1125.

Kashiwabara et al., Radiation-Induced Oxidation of Plastics, Radiation Processing of Polymers, Chapter 11, (1992) pp. 221-254.

Kato et al. "Structural Changes and Melting Behavior of ?-Irradiated Polyethylene" Japanese Journal of Applied Physics. vol. 20, No. 4. (Apr. 1981) p. 691-697.

Kitamaru et al. "Size and Orientation of Cristallites in Lightly Cross-linked Polyethylene, Crystallized from the Melt Under Uniaxial Compression" Die Makromolekulare Chemie. vol. 175 (1974) p. 255-275.

Kitamaru et al. "Structure and Properties of Lightly Crosslinked Crystalline Polymers Crystallized or Processed Under Molecular Orientation" Journal of Polymer Science: Macromolecular Reviews. vol. 14 (1979) p. 207-264.

Kitamaru et al. "The Properties of Transparent Film Made from Linear Polyethylene by Irradiation Cross-Linking" Properties of Transparent Film. vol. 6, No. 3 (May-Jun. 1973) p. 337-343.

Kitamaru et al. "A Commentary Remark on the Isothermal Crystallization of a Polyethylene Gel from the Stretched Molten State" Bull. Inst. Chem. Res. vol. 46, No. 2 (1968) p. 97-106.

Kurth et al., "Effects of Radiation Sterilization on UHMW-Polyethylene" ANTEC. (1987) p. 1193-1197.

Kurtz et al., Comparison of the Properties of Annealed Crosslinked (Crossfire™) and Conventional Polyethylene as Hip Bearing Materials, Bulletin—Hospital for Joint Diseases, vol. 61, Nos. 1 & 2, (2002-2003) pp. 17-26.

Lewis, G. "Properties of Crosslinked Ultra-High-Molecular Weight Polyethylene" Biomaterials. vol. 22 (2001) p. 371-401.

Lin et al. "Review Structure and Plastic Deformation of Polyethylene" Journal of Materials Science. vol. 29 (1994) p. 294-323.

Matsubara et al. "The Wear Properties of High-Density Polyethylene Irradiated by Gamma Rays" Wear. vol. 10 (1967) p. 214-222.

Meyer, B. "Recent Developments in Radiation Sterilizable Plastics" ANTEC. (1987) p. 1190-1192.

Minkova et al. "Blends of Normal High Density and Ultra-High Molecular Weight Polyethylene, ? Irradiated at a Low Dose" Colloid Polym Sci. vol. 268 (1990) p. 1018-1023.

Minkova, L. "DSC of ?-Irradiated Ultra-High Molecular Weight Polyethylene and High Density Polyethylene of Normal Molecular Weight" Colloid Polym Sci. vol. 266 (1988) p. 6-10.

Muratoglu et al. "A Novel Method of Cross-Linking Ultra-High-Molecular Weight Polyethylene to Improve Wear, Reduce Oxidation, and Retain Mechanical Properties" The Journal of Arthroplasty. vol. 16, No. 2 (2001) p. 149-160.

Nakayama et al. "Structure and Mechanical Properties of Ultra-High Molecular Weight Polyethylene Deformed Near Melting Temperature" Pure & Appl. Chem. vol. 63, No. 12 (1991) p. 1793-1804.

Narkis et al., Structure and Tensile Behavior of Irradiation—and Peroxide—Crosslinked Polyethylenes, J. Macromol. Sci.—Phys., vol. B 26, No. 1, (1987) pp. 37-58.

Nusbaum et al., The Effects of Radiation Sterilization on the Properties of Ultrahigh Molecular Weight Polyethylene, Journal of Biomedical Materials Research, vol. 13, (1979) pp. 557-576.

U.S. Appl. No. 14/313,679, filed Jun. 24, 2014, Rodgers et al.

"International Application Serial No. PCT/US2014/051238, International Preliminary Report on Patentability mailed Feb. 25, 2016", 9 pgs.

"International Application Serial No. PCT/US2014/051238, International Search Report mailed Feb. 11, 2015", 5 pgs.

"International Application Serial No. PCT/US2014/051238, Written Opinion mailed Feb. 11, 2015", 7 pgs.

O'Neill et al. "The Distribution of Oxidation Products in Irradiated Ultra-High Molecular Weight Polyethylene" Polymer Degradation and Stability. vol. 49 (1995) p. 239-244.

Oonishi et al. "Comparison of Wear of UHMWPE Sliding Against Metal and Alumina in Total Hip Prostheses—Wear Test and Clinical Results" 3rd World Biomaterials Congress, Transactions. (Apr. 1988) p. 337.

Oonishi et al. "Comparisons of Wear of UHMW Polyethylene Sliding Against Metal and Alumina in Total Hip Prostheses" Bioceramics. vol. 1 (1989) p. 272-277.

Oonishi et al. "Effect of Cross-Linkage by Gamma Radiation in Heavy Doses to Low Wear Polyethylene in Total Hip Prostheses" Journal of Materials Science: Materials in Medicine. vol. 7 (1996) p. 753-763.

Oonishi et al. "Improvement of Polyethylene by Irradiation in Artificial Joints" Radiat. Phys. Chem. vol. 39, No. 6 (1992) p. 495-504.

Oonishi et al. "In Vivo and In Vitro Wear Behaviour on Weightbearing Surfaces of Polyethylene Sockets Improved by Irradiation in Total Hip Prostheses" Surface Modification Technologies V. (1992) p. 101-112.

Oonishi et al. "SEM Observation on the Clinically Used Gamma-Irradiated Reinforced HDP Socket in Total Hip Replacement" Clinical Implant Materials, Advances in Biomaterials. vol. 9 (1990) p. 379-384.

Oonishi et al. "The Optimum Dose of Gamma Radiation-Heavy Doses to Low Wear Polyethylene in Total Hip Prostheses" Journal of Materials Science Materials in Medicine. vol. 8 (1997) p. 11-18.

Oonishi et al. "Wear Resistance of Gamma-Ray Irradiated U.H.M. W. Polyethylene Socket in Total Hip Prosthesis—Wear Test and Long Term Clinical Results" MRS Int'l. Mtg. on Adv. Mats. vol. 1 (1989) p. 351-356.

Oonishi et al. "Wear Resistance of Gamma-Ray Irradiated UHMWPE Socket in Total Hip Prostheses—Wear Test and Long Term Clinical Results" 3rd World Biomaterials Congress, Transactions. (Apr. 1988) p. 588.

Oral et al. Diffusion of Vitamin E in Ultra-high Molecular Weight Polyethylene. p. 1-36. 2008.

Oral, et al. "Wear Resistance and Mechanical Properties of Highly Crosslinked UHMWPE Doped with Vitamin-E" Jun. 2006; 21(4); 580-491.

Patel, G. "Acceleration of Radiation-Induced Crosslinking in Polyethylene by Diacetylenes" Radiat. Phys. Chem. vol. 14 (1979) p. 729-735.

Peacock, A. Handbook of Polyethylene: Structures, Properties, and Applications, Chapter 8—Orientation of Polyethylene. Copyright 2000, Marcel Dekker, Inc., New York, NY.

Premnath et al. "Gamma Sterilization of UHMWPE Articular Implants: An Analysis of the Oxidation Problem" Biomaterials. vol. 17 (1996) p. 1741-1753.

Prins, et al. "Biaxial Orientation of Linear Polyethylenes Using the Compressive Deformation Process," Polymer Engineering and Science, Feb. 1997, vol. 37, No. 2, pp. 261-269.

"Researchers Get Awards for Orthopaedic Research", The American Academy of Orthopaedic Surgeons, News Release. (Mar. 19, 1998), available at http://www.aaos.org/wordhtml/press/98press/kappa.htm. (4 pages).

Rimnac et al. "Chemical and Mechanical Degradation of UHMWPE: Report of the Development of an In Vitro Test" Journal of Applied Biomaterials. vol. 5 (1994) p. 17-21.

"Researchers to Get Kappa Delta Awards for Achievements" The American Academy of Orthopaedic Surgeons, Academy News. (Mar. 19, 1998), available at http://www.aaos.org/wordhtml/98news/kappa.htm. (3 pages).

(56) References Cited

OTHER PUBLICATIONS

Rose et al. "Exploratory Investigations on the Structure Dependence of the Wear Resistance of Polyethylene" Wear. vol. 77 (1982) p. 89-104.
Salovey et al. "Irradiation of Ultra High Molecular Weight Polyethylene" Polymer Preprints. vol. 26, No. 1 (1985) p. 118-119.
Salovey, R. "On the Morphology of Crosslinking Polymers" Polymer Letters. vol. 2 (1964) p. 833-834.
Sandford et al. "Shelf Life Prediction of Radiation Sterilized Medical Devices" ANTEC (1987) p. 1201-1204.
Sawatari et al. "Crosslinking Effect of Ultrahigh Molecular Weight Polyethylene-Low Molecular Weight Polyethylene Blend Films Produced by Gelation/Crystallization From Solutions" Colloid Polym Sci. vol. 269, No. 8 (1991) p. 795-806.
Shen et al. "The Friction and Wear Behavior of Irradiated Very High Molecular Weight Polyethylene" Wear. vol. 30 (1974) p. 349-364.
Shinde et al. "Irradiation of Ultrahigh-Molecular-Weight Polyethylene" Journal of Polymer Science: Polymer Physics Edition. vol. 23 (Feb. 1985) p. 1681-1689.
Silverman, Radiation-Induced and Chemical Crosslinking: A Brief Comparison, Radiation Processing of Polymers, Chap. 2, (1992) p. 15-22.
Streicher, R. "Change in Properties of High Molecular Weight Polyethylenes After Ionizing Irradiation for Sterilization and Modification" Third International Conference on Radiation Processing for Plastics and Rubber (Nov. 1987) (9 pages).
Streicher, R. "Influence of Ionizing Irradiation in Air and Nitrogen for Sterilization of Surgical Grade Polyethylene for Implants" Radiat. Phys. Chem. vol. 31, No. 4-6 (1988) p. 693-698.
Streicher, R. "Investigation on Sterilization and Modification of High Molecular Weight Polyethylenes by Ionizing Irradiation" Reprint from beta-gamma 1/89 p. 34-43.
Streicher, R. "Ionizing Irradiation for Sterilization and Modification of High Molecular Weight Polyethylenes" Plastics and Rubber Processing and Applications. vol. 10, (1988) p. 221-229.
Streicher, R. "UHMW—Polyethylen als Werkstoff für artikulierende Komponenten von Gelenkendoprothesen (UHMW Polyethylene Used as a Material for the Articulating Components of Endoprostheses)" Biomed. Technik, vol. 38 (1993) p. 303-313.
Sultan et al., Advances in Crosslinking Technology, Plastics, Rubber and Composites Processing and Applications 21, (1994) pp. 65-73.
Sun et al. "Development of an Accelerated Aging Method for Evaluation of Long-term Irradiation Effects on UHMWPE Implants" Howmedica Inc., Pfizer Hospital Products Group. (1996) p. 969-970.
Sun et al. "Development of Stabilized UHMWPE Implants with Improved Oxidation Resistance Via Crosslinking" American Academy of Orthopaedic Surgeons—Scientific Exhibits, Presented at 63rd Annual Meeting of AAOS. (Feb. 22-26, 1996) p. 179-180.
Waldman et al. "Compressive Stress Relaxation Behavior of Irradiated Ultra-High Molecular Weight Polyethylene at 37°C." Journal of Applied Biomaterials. vol. 5 (1994) p. 333-338.
Wang et al. "Melting of Ultrahigh Molecular Weight Polyethylene" Journal of Applied Polymer Science. vol. 34 (1987) p. 593-599.
Ward, I. "New Developments in the Production of High Modulus and High Strength Flexible Polymers" Progr Colloid Polym Sci. vol. 92 (1993) p. 103-110.
Ward, I. "Recent Developments in Oriented Polymers for Biomedical and Engineering Applications" Macromol. Symp. vol. 195 (2003) p. 293-296.
Williams, J. "Radiation Stability of Polypropylene" ANTEC. (1987) p. 1198-1200.
Wilson et al. "Proton Modification of Ultra High Molecular Weight Polyethylene to Promote Crosslinking for Enhanced Chemical and Physical Properties" Mat. Res. Soc. Symp. Proc. vol. 396 (1996) p. 311-316.
Wong et al. "Molecular Deformation Processes in Gel-Spun Polyethylene Fibres" Journal of Materials Science. vol. 29 (1994) p. 520-526.
Yongziang et al., Crosslinking of Wire and Cable Insulation Using Electron Accelerators, Radiation Processing of Polymers, Chap. 5, (1992) pp. 71-92.
Zhao et al. "Effect of Irradiation on Crystallinity and Mechanical Properties of Ultrahigh Molecular Weight Polyethylene" Journal of Applied Polymer Science. vol. 50 (1993) p. 1797-1801.
Zoepfl et al. "Differential Scanning Calorimetry Studies of Irradiated Polyethylene: I. Melting Temperatures and Fusion Endotherms" Journal of Polymer Science: Polymer Chemistry Edition. vol. 22 (1984) p. 2017-2032.
Zoepfl et al. "Differential Scanning Calorimetry Studies of Irradated Polyethylene: II. The Effect of Oxygen" Journal of Polymer Science: Polymer Chemistry Edition. vol. 22 (1984) p. 2033-2045.

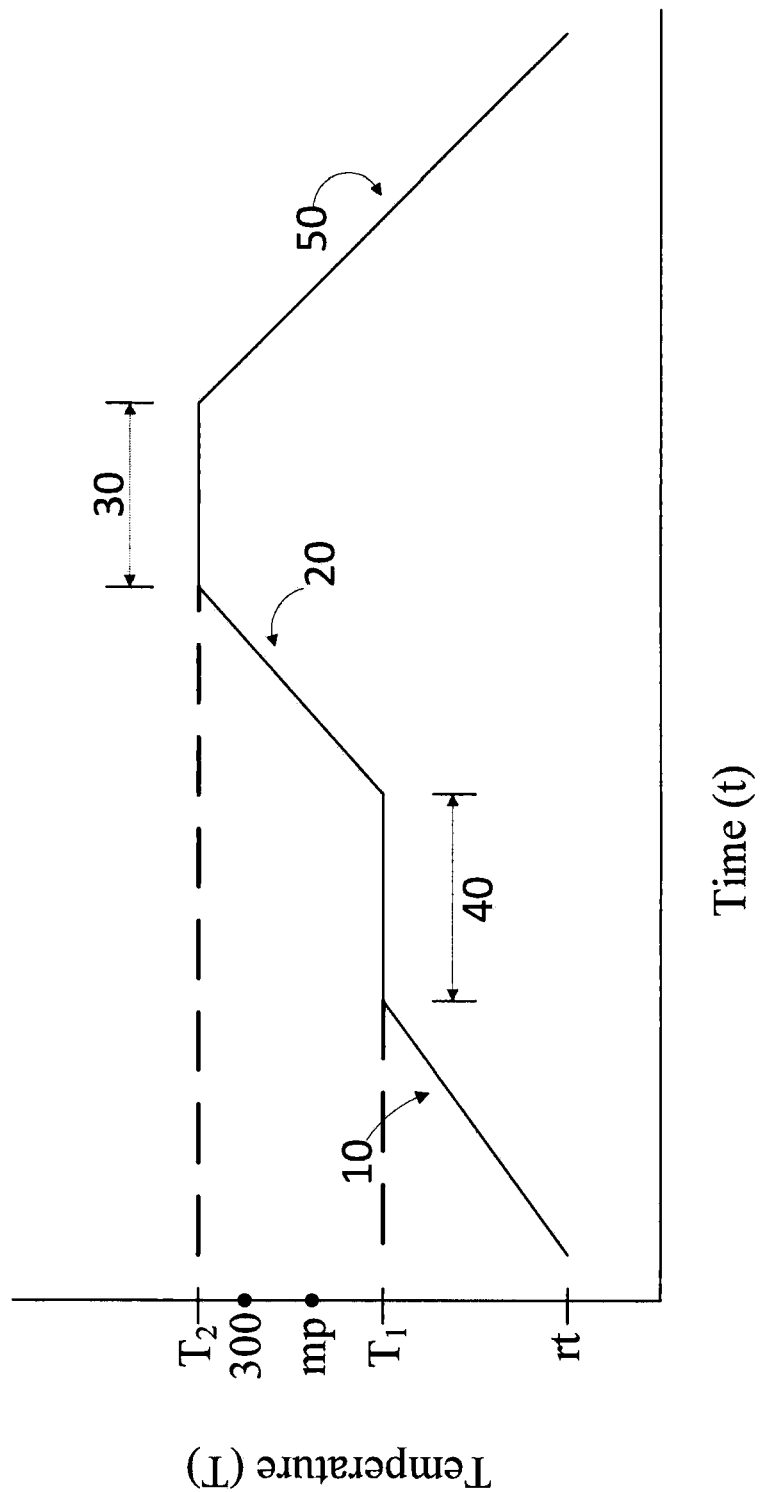

METHOD FOR MAKING ULTRA HIGH MOLECULAR WEIGHT POLYETHYLENE

CROSS-REFERENCE TO RELATED APPLICATIONS

This application claims the benefit of U.S. Provisional Application No. 61/866,452, filed on Aug. 15, 2013. The entire disclosure of the above application is incorporated herein by reference.

INTRODUCTION

Ultrahigh molecular weight polyethylene (UHMWPE) is a material of choice for fabricating bearing components of artificial joint components like acetabular cups and tibial bearings. Preferably, suitably processed UHMWPE has a combination of desirable properties, including high tensile strength and other physical properties, high resistance to oxidation, and wear resistance and long life. To achieve useful combinations of properties, the industry has used a wide of variety of techniques, such as gamma irradiation and other crosslinking, heat treatments, doping with antioxidants, extrusion, deformation, isostatic pressure, and the like. General background information and description of known aspects of UHMWPE treatment is found for example in U.S. Pat. No. 8,398,913, Schroeder et al., issued Mar. 19, 2013; U.S. Pat. No. 7,547,405, Schroeder et al., issued Jun. 16, 2009; U.S. Patent Application Publication No. 2012/0267819, Freedman, published Oct. 25, 2012; and U.S. Patent Application Publication No. 2009/0030524, Schroeder et al., published Jan. 29, 2009, the full disclosures of which are hereby incorporated by reference.

To increase wear resistance, UHMWPE is crosslinked by gamma irradiation, which tends to cause an undesirable increase in the concentration of free radicals in the bulk polymer. The free radicals can react with oxygen, which leads to degradation of the polymer. Free radicals are efficiently removed from the bulk polymer by heat treating above the melt temperature of the polymer, but treating above the melt temperature has the disadvantage of lowering the physical properties of an implant bearing component made from the polymer. Deformation of the UHMWPE after crosslinking is also used to reduce the concentration of free radicals, but again, it is preferred to keep the deformation temperature below the melting point of the polymer to avoid the noted diminution of physical properties.

Another way to improve the oxidation resistance properties of a polymer like UHMWPE is to dope the bulk polymer with an antioxidant such as tocopherol (vitamin E). The antioxidant in the polymer acts as a free radical scavenger and prevents oxidation damage. The UHMWPE is optionally crosslinked before or after doping. After the doping step, it is preferred in some processes to further heat treat the polymer in an annealing or homogenizing step to permit the antioxidant to diffuse more completely into the bulk polymer. For better performance and faster results, it is desirable in many cases to perform these post-consolidation heat treating steps at as high a temperature as possible without negatively affecting the physical properties of the polymer. In many cases, this means refraining from heat treating at temperatures above the melting point.

SUMMARY

High temperature heat processing of consolidated UHMWPE has now been found to enable subsequent heat processing above the melting temperature, be it crosslinking, deformation, doping with antioxidant, or homogenizing after such doping. Advantageously, the UHMWPE so treated can be processed at temperatures above the melting temperature, without degrading the physical properties of the UHMWPE. As a result, the UHMWPE has suitable properties for use as bearing components for implants.

It has further been discovered that, under certain conditions, high temperature heat processing of UHMWPE can lead to undesirable damage in the material treated, which is characterized herein as cavitation damage. The current teachings thus relate as well to a solution found to the cavitation problem, which enables production of UHMWPE with properties suitable for in vivo use.

Specifically, it has been found that applying pressure in a certain way and at suitable times during a heating protocol reduces or eliminates cavitation in the heat treated UHMWPE. Onset of cavitation is observed to occur when the UHMWPE is heated to a temperature about 300° C. or higher, for example to a temperature of about 310° C. and higher, or to a temperature of about 320° C. and higher. To prevent cavitation in these temperature ranges, pressure is applied to the UHMWPE before the temperature reaches that value.

Pressure is applied in a particular way, which will be referred to as radial pressure treatment or radial constraint. To apply this pressure, at least one axis of the UHMWPE being treated is unconstrained while other axes are constrained during the heat treatment. In various embodiments, constraining pressure is applied to the UHMWPE before it is heated above 300° C. By applying pressure before 300° C., one avoids or decreases, cavitation occurring in the UHMWPE. After the UHMWPE is cooled down, it can be subsequently heat treated above the nominal melting temperature without loss of mechanical properties. This property is taken advantage of in subsequent treatment steps including gamma irradiation crosslinking, deformation after crosslinking, doping with antioxidant with or without crosslinking, and homogenizing or annealing after doping. Heating during these steps can be carried out above the onset melt temperature of the UHMWPE, for example at about 130° C. or higher. In various embodiments heating is carried out at a temperature below the degradation temperature of the polymer, for example about 220° C. or lower, about 210° C. or lower, or about 200° C. or lower.

One way of applying radial pressure during the heating step to avoid cavitation damage in the UHMWPE is to place a consolidated UHMWPE in the form of a rod or bar inside a sleeve, such as a metal tube, dimensioned slightly larger than the dimension of the UHMWPE. Upon heating the UHMWPE expands and makes contact with the tube, which constrains the UHMWPE in a radial direction, while leaving the longitudinal axis unconstrained. Pressure is thus applied in a radial direction as the UHMWPE thermally expands and pushes against the inner wall of the sleeve.

BRIEF DESCRIPTION OF THE DRAWINGS

FIG. 1 illustrates a heating protocol.

DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. A non-limiting discussion of terms and phrases intended to aid understanding of the present technology is provided at the end of this Description.

1. Cavitation Damage in a Bulk Polymer

Cavitation, as used herein, refers to voids, which are typically ellipsoidal, that form within the bulk of UHMWPE or other polymer as a result of heating at high temperatures. Such damage is observed at temperatures higher than those normally associated with heat treating UHMWPE. At about 300° C. and lower, the phenomenon is not generally observed, while above about 300° C., it tends to be experimentally observed, the more so in larger diameter pieces or as the temperature increases above about 300° C. At intermediate temperatures, onset of cavitation can be observed, especially when experiments are run in multiples. Sometimes cavitation is observed in some but not all samples run at a temperature in this range. And sometimes a single experiment shows no cavitation, whereas running multiples allows observation of the effect.

Cavitation is characterized by visual changes observed in cross sections of polymer. The changes include observation of voids, pits or holes and the like in the bulk of the polymer, giving an overall impression of damage such as would be caused by expanding gas, violent implosions of gas, or a pulling apart of the polymer molecules due to the stress induced during cooling. Onset is observed around 300° C. or higher, as noted, and becomes more prevalent as the temperature is increased or as the geometry (e.g., size, diameter) of the polymer sample is increased. In various embodiments, this observed cavitation damage is prevented by applying radial pressure, or radial constraint, as further described herein.0

2. Mitigating or Preventing Cavitation Damage

In one embodiment, a method of reducing, avoiding, or preventing cavitation damage involves inserting a consolidated polymer such as UHMWPE, in the form of a cylindrical bar of diameter from about 2 inches to about 4 inches, into a rigid sleeve, wherein the sleeve has a diameter greater than that of the UHMWPE bar, and wherein upon insertion, an inner wall of the sleeve contacts some but not all of the UHMWPE bar. It contacts at least some of the inner diameter (i.d.) by gravity alone. Then the UHMWPE is heated in the sleeve to a temperature of about 300° C. or higher, after which it is cooled and removed from the sleeve. In various embodiments, the UHMWPE is heated in the sleeve to a temperature about 305° C. or higher, about 310° C. or higher, about 320° C. or higher, about 330° C. or higher, about 340° C. or higher, or about 350° C. or higher. The sleeve is dimensioned so that the UHMWPE thermally expands and contacts the entire inner wall of the sleeve during the heating step. In the cooling step, the temperature of the UHMWPE is lowered to such an extent that the UHMWPE shrinks and loses contact with the inner wall of the sleeve, so that it can be removed from the sleeve.

In various embodiments, the sleeve is selected to be longer than the inserted UHMWPE, and the UHMWPE is inserted all the way into the sleeve so that there is overhang of sleeve on both ends of the UHMWPE rod. The heating step, which can consist of several different time and temperature settings constituting a heating protocol, is advantageously carried out in an inert atmosphere, or at least in an atmosphere containing less oxygen than air. Vacuum can also be applied during the heating. Whatever the heating protocol, it involves bringing the oven to a temperature of about 300° C. or higher, about 305° C. or higher, about 310° C. or higher, about 320° C. or higher, about 330° C. or higher, about 340° C. or higher, or about 350° C. or higher, for a time sufficient to impart the noted benefits. Examples include heating at these temperatures for one hour or more, five hours or more, and ten hours or more, while maintaining pressure.

The sleeve that holds the UHMWPE during heating is made of a rigid material that can withstand the temperature and pressure conditions of the treatment. Suitable metal tubes are available, such as those made from aluminum or steel. A standard thin walled pipe with outer diameter (o.d.) of four inches and an inner diameter (i.d.) of about 3.87 inches is suitable. In one embodiment, a sleeve of that dimension is used and a UHMWPE rod of about 3.75 inches diameter is inserted before heating.

In another embodiment, a process for reducing or eliminating cavitation in a heat-treated UHMWPE involves heating a consolidated UHMWPE at a temperature of about 310° C. or higher where cavitation would normally occur, and reducing cavitation by applying pressure on the UHMWPE during the heating.

In various embodiments, methods of producing cavitation-free UHMWPE for subsequent processing into bearing materials for medical implants involve pressurizing a consolidated UHMWPE in the radial direction while heating to an elevated temperature about 300° C. or higher, and at the same time applying ambient pressure conditions in a longitudinal direction. This radial constraint is believed to lead to the elimination of cavitation that would otherwise be observed as a result of the heat treating and to the advantageous properties observed in the UHMWPE.

A convenient experimental method of applying radial constraint during heat treating is to provide a consolidated UHMWPE in the form of a bar, rod, or cylinder, and place the bar, rod, or cylinder in a suitable constraining device. The constraining device can be conveniently chosen from metal tubes of slightly greater dimension than the UHMWPE to be heat treated. In the radial direction, the device is a few millimeters up to a centimeter or so larger, and in the longitudinal direction the device is a few centimeters longer. Upon heating, the UHMWPE expands until it contacts the inner surface of the constraining device. Thermal expansion against the rigid inner surface applies pressure on the UHMWPE, constraining it in the radial direction, while leaving the longitudinal direction unconstrained. Application of constraining pressure before the temperature reaches about 300° C. and leaving one axis unconstrained are believed to lead to the advantages observed.

In various embodiments, the starting material for heat treating with radial constraint is a consolidated UHMWPE, which is for example provided in the form of a bar or rod, as further described herein. In certain embodiments, the starting material UHMWPE further contains an antioxidant material. Non-limiting examples of antioxidant compounds include tocopherols such as vitamin E, carotenoids, and triazines. Other antioxidants include vitamin C (ascorbic acid) and its derivatives; gallate esters such propyl, octyl, and dodecyl; lactic acid and its esters, tartaric acid and its salts and esters, as well as ortho phosphates. Further non-limiting examples include polymeric antioxidants such as members of the classes of phenols; aromatic amines; and salts and condensation products of amines or amino phenols with aldehydes, ketones, and thio compounds. Non-limiting examples include para-phenylene diamines and diaryl amines.

One method of incorporating vitamin E into UHMWPE is by post-consolidation diffusion through a two-step process comprising doping with vitamin E and further homogenization in an inert atmosphere. Another method of incorporating vitamin E into consolidated UHMWPE is blending of antioxidant into a polymer resin powder and then consolidating the blend into near-implant form. Further details of doping and homogenization, as well as examples of suitable antioxidants, are found in U.S. Patent Application Publication No. 2009/0030524, Schroeder et al., published Jan. 29, 2009, the entire disclosure of which is hereby incorporated by reference.

The heat treated UHMWPE resulting from these processes can be used in subsequent processes involving one or more steps of crosslinking, deformation, antioxidant doping, and antioxidant homogenizing. In some embodiments, it is desirable to keep the temperature applied during the subsequent steps below the melting temperature of the UHMWPE, which is about 145° C. or lower, about 140° C. or lower, about 137° C. or lower, or about 130° C. or lower in various embodiments, depending on the UHMWPE used. However, when a consolidated UHMWPE is first heat treated with radial constraint as detailed herein, the subsequent steps on the UHMWPE can be carried out even above the UHMWPE melting temperature, such as at a temperature of about 130° C. or higher. This allows the use of remelting technology without giving up physical properties.

3. Subsequent Heat Treating:

3.1. Non-Eluting Vitamin E Doped

To illustrate, the present technology provides methods of making a non-eluting antioxidant doped UHMWPE, in the form of an implant bearing component. In an illustrative embodiment, the process includes the steps of: (a) providing a preform made of consolidated UHMWPE made by heat treating with radial constraint as described herein; (b) irradiating the pre-form with high energy irradiation such as γ-irradiation to crosslink the UHMWPE; (c) doping the crosslinked pre-form by exposing it to a composition comprising about 10% or more by weight of an antioxidant; (d) removing the doped material from contact with the antioxidant composition; and then (e) annealing or homogenizing by heating the doped material for a further time period; followed by (f) making an implant bearing component from the doped material, and (g) packaging and sterilizing the bearing component or a medical implant comprising the bearing component. In an embodiment, the preform is in the form of a cylindrical UHMWPE rod, which is machined to the final shape of an implant bearing component in step f). In other embodiments, the preform is a near shape bearing component. An example is one from which about 1 mm or more, but no more than about 15 mm of material are removed to make the component in step f). In a preferred embodiment, the vitamin E index of the bearing component made in step f) is at least 0.01 and is less than or equal to about 0.2 throughout the component. Further details and disclosure of steps b) through f) are found in U.S. Patent Application Publication No. 2009/0030524, Schroeder et al., published Jan. 29, 2009, which is hereby incorporated by reference. Advantageously, any or all of the steps b), c), and e) can also be carried out above the onset melting temperature of the UHMWPE.

3.2. Subsequent Heat Treating: Heat Treating after Crosslinking

In another embodiment, the heat treated and consolidated UHMWPE made with radial constraint is subsequently crosslinked with gamma irradiation, and then heat treated to eliminate or reduce the free radicals generated by the irradiation. While the heating is carried out below the melting point in some embodiments, it can advantageously be carried above the melting temperature for a faster process and for more complete elimination of the free radicals, in order to obtain an oxidation resistant UHMWPE that can be further processed or machined into an implant bearing component.

3.3. Subsequent Heat Treating: Deforming after Crosslinking

In another embodiment of a method for processing UHMWPE for subsequent use in an artificial joint bearing component, the consolidated UHMWPE made with radial constraint is subsequently crosslinked with gamma irradiation, and then mechanically deformed to reduce the concentration of free radicals in the UHMWPE caused by the irradiation. In one embodiment, deforming is carried out by extruding through a reducing die, extruding through an increasing die, or extruding through an isoareal die, as described in U.S. Pat. No. 7,547,405, Schroeder et al., issued Jun. 16, 2009, the entire disclosure of which is incorporated by reference. After crosslinking and deforming, the deformed UHMWPE is cooled with or without maintaining the deformed shape. Following cooling, the UHMWPE is optionally heat treated for a time sufficient to reduce internal stresses or to recover shape if the cooling was done under pressure keeping the deformed state. The crosslinking, deforming, extruding, and the post-cooling heat treatment are carried out below the melting point or above the melting point of the UHMWPE.

3.4. Subsequent Heat Treating: Antioxidant Doping

In another embodiment, a method of making an oxidation resistant UHMWPE for use in making a bearing component of a medical implant involves heat treating a consolidated UHMWPE by heating above 300° C. while applying radial pressure; doping the heat treated UHMWPE with an antioxidant; and homogenizing the doped UHMWPE by heating above room temperature. In various embodiments, the doping and/or the homogenizing steps are carried out at a temperature higher than the melting temperature of the UHMWPE.

Further details of the individual method steps are given herein. Unless context requires otherwise, it is understood that parameters given for the individual method steps can be mixed and matched with other steps of other methods to provide description of methods that take advantage of the discovery that cavitation damage from heat treatment can be controlled with radial constraint.

4. Polymers

For implants, preferred polymers include those that are wear resistant, have chemical resistance, resist oxidation, and are compatible with physiological structures. In various embodiments, the polymers are polyesters, polymethylmethacrylate, nylons or polyamides, polycarbonates, and polyhydrocarbons such as polyethylene and polypropylene. High molecular weight and ultra high molecular weight polymers are preferred in various embodiments. Non-limiting examples include high molecular weight polyethylene, ultra high molecular weight polyethylene (UHMWPE), and ultra high molecular weight polypropylene. In various embodiments, the polymers have molecular ranges from approximate molecular weight range in the range from about 400,000 to about 10,000,000.

UHMWPE is used in joint replacements because it possesses a low co-efficient of friction, high wear resistance, and compatibility with body tissue. UHMWPE is available commercially, for example from Ticona, Inc. of Bishop, Tex., which sells the GUR series of resins. Commercial grades are available having molecular weights in the preferred range described above. The resin is made into bulk materials such as bar stock or blocks using various techniques such as compression molding or ram extrusion.

In a non-limiting example, the resin is made into a fully consolidated stock in a series of cold and hot isostatic pressure treatments such as described in U.S. Pat. No. 5,688,453, England et al., issued Nov. 18, 1997, and U.S. Pat. No. 5,466,530, England et al., issued Nov. 14, 1995, the disclosures of which are hereby incorporated by reference. The fully consolidated stock is suitable for subsequent crosslinking and further treatment as described herein.

5. Bulk Form of the Materials

The UHMWPE that undergoes the heat- and pressure treatment described herein is provided in a consolidated bulk form characterized by an axial direction and a transverse direction orthogonal or perpendicular to the axial direction.

In various contexts, the axial direction is called longitudinal, and the transverse direction is called radial. The respective axes of the bulk material are parallel to the directions so defined. In subsequent processing steps after consolidation, pressure is applied on the bulk material, preferably in at least the transverse direction, to counteract or prevent the cavitation damage observed from temperature treatment above about 300° C.

The axial direction is also the direction in which less or no pressure is applied by the constraining device or sleeve. In this aspect, the axial direction of the bulk material is the direction perpendicular to the application of the pressure that mitigates the cavitation damage.

In various embodiments, the cross section in the axial direction is constant throughout the bulk material. This is the case for, say, straight cylinders where the (straight) main axis of the cylinder is taken as the axial direction. This is a preferred arrangement. But the bulk material can also be provided in the form of an elongated body where the main axis changes direction along the axial direction. Such would be the case for bent or curved rods, by way of non-limiting example. For such bulk materials, the transverse directions are still defined as those directions which are at right angles to the axial direction, whatever the local orientation of the axial direction of the bulk material.

The shape of the cross section transverse to the axial direction of the bulk material is not particular limited and includes circles and their topological equivalents (such as ovals, ovoids, ellipses, and other areas bounded by a closed curve), as well as other shapes. Non-limiting examples of shapes include regular and non-regular polygons (e.g., squares, rectangles, rhombus, and trapezoids for four sided figures), stars, convex shapes, and concave shapes. Round cross sections are naturally preferred for bearing components that are round, like an acetabular cup. For other bearing components, it may be convenient to provide the consolidated UHMWPE in a different configuration. A non-limiting example is a UHMWPE with a kidney shaped cross-section especially for tibial bearings. And certain shapes are preferred because of their relative ease of manufacture. Such include circular cross-sections, readily produced by RAM extrusion for example.

In certain embodiments, the axial direction of the bulk material also defines the preferred direction in which implant bearing components such as acetabular cups are to be machined. That is, bearing components are conveniently made or machined from the treated bulk polymer by cutting the rod into billets and machining the bearing component from the billets or alternatively machining the finished bearing geometry directly from the bulk polymer.

In an exemplary embodiment, the bulk material is in the form of a rod or cylinder having a circular cross section. The axial direction is parallel to the main axis of the cylinder, while the transverse direction is at right angles to the axial direction. In other words, the existence of the axial direction defines an orthogonal direction referred to as "transverse" in this application. Especially when the cross section of the bulk material is isotropic as in the case of a cylinder, the transverse direction can be described as "radial," and the transverse axis as a radial axis. The main axis of the bulk material can also be called the longitudinal axis. As used here, the longitudinal axis is parallel to the axial direction. Application of pressure in certain embodiments is also referred to as radial, or as circumferential for the case where the UHMWPE approximates a circular cylinder.

In the non-limiting case of a rod or cylinder, a cross section of the bulk material perpendicular to the axial direction or longitudinal axis is a circle. Other bulk materials characterized by an axial direction may be used that have other perpendicular cross sections. In a non-limiting example, a square cylinder can be provided that has a square cross section perpendicular to the axial direction. Other bulk materials characterized by an axial direction can have rectangular, polygonal, star, lobed, and other cross sections perpendicular to the axial direction.

In various embodiments, the axial direction of the bulk polymeric material is elongated compared to the orthogonal or radial direction. For example, in the case of UHMWPE, a commercially available bulk material is a cylinder approximately 3 inches in diameter and approximately 14 inches in length. Another commercially available material is provided in lengths of about 3 feet or greater. A 3.5 inch cylinder can also be used. Other commercially available UHMWPE rods include those having a diameter of 2 inches, 3.75 inches, or 4.0 inches. The length corresponds to the axial direction and the diameter corresponds to the radial direction. As described below, bearing components for implants are preferably machined from billets cut in the axial direction. For efficiency in manufacturing it is convenient to produce a number of bearing components from a single bulk material treated by the methods of the invention. For this reason, the bulk material is usually to be extended in an axial direction so as to be able to cut a plurality of billets from the material for use in further machining of the bearing components.

As described above, bulk material characterized by an axial direction is further characterized as having a variety of cross sectional areas perpendicular to the axial direction. In various embodiments, the dimensions of the cross sectional areas perpendicular to the axial direction are more or less constant along the axial direction from the beginning to the end or from the top to the bottom of the bulk material. In various other embodiments, bulk materials may be provided to have cross sectional areas that vary along the length or axial direction of the bulk material. In the case where the cross sectional area of the bulk material is constant along the axial direction of the bulk material, compressive force applied as described below will generally be applied to the bulk material in a direction perpendicular to the axial direction. In the case where the cross sectional area varies along the axial direction of the bulk material, compressive force applied to the bulk material may have a component in the axial direction due to the geometry of the bulk material. However, in all cases at least a component of the compressive force will be applied on the bulk material in a direction orthogonal to the axial direction.

6. Implants

In various embodiments, implants are manufactured using preformed polymeric compositions having the structures described herein and made by the methods described herein. In general, UHMWPE processed by the methods described herein is fabricated into bearing components for a number of implants. Non-limiting examples of implants include hip joints, knee joints, ankle joints, elbow joints, shoulder joints, spine, temporo-mandibular joints, and finger joints. In hip joints, for example, the preformed polymeric composition can be used to make the acetabular cup or the insert or liner of the cup. In the knee joints, the compositions can be used to make the tibial plateau, the patellar button, and trunion or other bearing components depending on the design of the joints. In the ankle joint, the compositions can be used to make the talar surface and other bearing components. In the elbow joint, the compositions can be used to make the radio-numeral or ulno-humeral joint and other bearing components. In the shoulder joint, the compositions can be used to make the glenero-humeral articulation and other bearing components. In the spine, intervertebral disc replacements and facet joint replacements may be made from the compositions.

7. Applying "Radial Pressure"

In general, the UHMWPE for use in embodiments of the invention is characterized by a longitudinal (or axial) direction and a transverse (or radial) direction. An example of this is a cylindrical rod, where the axial direction is the long axis of the cylinder and the transverse direction is perpendicular or orthogonal to the axial. In various embodiments, pressure is applied in the transverse direction during the heating steps described herein. In certain embodiments, the pressure is applied solely in the transverse direction, so that the UHMWPE sees essentially no pressure in the axial direction.

One way of applying radial pressure during heat treatment of the consolidated UHMWPE is to hold the polymer in a constraining device that resists the thermal expansion of the polymer and applies pressure to the polymer as an equal and opposite reaction to the pressure applied to the constraining device by the expanding polymer. In one aspect, the constraining device is therefore a rigid member into which the consolidated polymer can be inserted. Upon heating, the polymer expands so that its radial or transverse axis contacts the inner wall of the constraining device, but the axial ends do not touch the wall and thus see ambient pressure conditions.

The constraining device can be made of a series of rollers disposed in such a way that they maintain a constant dimension and resist expansion of the polymer. A simpler constraining device consists of an open ended sleeve into which the consolidated rod can be inserted, with enough, but not too much, clearance to provide for expansion of the polymer into the inner wall of the sleeve upon heating. In a particular embodiment, it is convenient to use a rigid pipe or tube. For example, a tube made of metal is suitable since it is rigid and is able to withstand temperatures about 300° C. or higher to which the consolidated polymer will be exposed during the heat treatment.

Pressure is thus applied to the transverse direction of the polymer by the sleeve, where the inner wall of the sleeve contacts the thermally expanding polymer. At the same time, the ends of the UHMWPE (representing the axial or longitudinal direction) are exposed to the ambient pressure conditions of the oven, which generally operates at atmospheric pressure. Pressure is applied in this way with radial constraint as long as the polymer and the sleeve are dimensioned such that at some temperature below the top heat treating temperature, the polymer can be inserted into the sleeve without contacting the entire portion of the inner wall of the sleeve, and at the top heat treating temperature the polymer expands to fill the sleeve, contacting the entire wall of the sleeve. Thermal expansion of the polymer to contact the inner wall acts to apply pressure in this way. At the same time that the transverse (radial) axes of the polymer are thus confined or constrained, the longitudinal axis is unconstrained, and sees essentially the ambient pressure conditions of the oven in which the pressure heat treating is being carried out.

In various embodiments, heat treating is carried out at a temperature of about 310° C. or higher, or about 320° C. or higher. In various embodiments, the UHMWPE is heated in the sleeve to a temperature about or above 305° C., about or above 310° C., about or above 320° C., about or above 330° C., about or above 340° C., or about or above 350° C. Surprisingly, it is observed that applying pressure in the manner noted, by thermally expanding the UHMWPE against a rigid material within a constrained volume, reduces or eliminates the cavitation damage otherwise observed under the conditions.

As regards the pressure seen by the polymer during the heat treatment, it is at least theoretically possible to place transducers to measure an absolute value of pressure seen by the polymer in the transverse direction. But for purposes of the current teachings, the fact of pressure application (or pressurization or other equivalent phrase) is assumed from the thermal expansion of the polymer against the constraining device (such as the inner wall of the noted sleeve or metal tube), the subsequent cooling and contraction to a size able to be easily removed, and the resulting improvements observed in the polymer. These latter include the lack of or decrease of evidence of cavitation damage, and the improved behavior in subsequent heat treating processes, especially in those heat treating processes carried out above the melting point of the polymer.

In this way, thermal expansion of the polymer into the inner wall of the restraining device causes or results in a pressurization, or an application of pressure in a transverse (or radial) direction. In various embodiments described herein, that pressurization is referred to as pressure heat treatment, heat treatment with radial constraint, applying radial pressure during heat treatment, or equivalent phrases.

To avoid damage from oxygen during the high temperature pressure treatments, it is helpful to carry out heat treating and pressurizing (i.e., the heat treating with radial constraint discussed above) in an atmosphere with less oxygen than air. A vacuum or partial vacuum can be used. An inert gas such as nitrogen or argon, to give non-limiting examples, can also be used, in full or partial replacement of air. In use, an oven is first purged with an inert gas such as nitrogen. Then one or more consolidated polymers are placed in an oven and subject to a heating protocol that includes heating to a temperature about 300° C. or higher. A constraining device, such as the sleeve or tube, is dimensioned so that the polymer expands and sees pressure from the inner wall at a temperature about 300° C. or lower. The applied pressure is believed to permit the heating to go above 300°, above 305° C., above 310° C., above 320° C., or above 350° C. without subjecting the polymer to cavitation damage.

It is normally preferred to wrap the UHMWPE in a wrap material such as a high melting sheet or foil, in order to avoid having the UHMWPE stick to the material of the inner wall of the sleeve. In non-limiting fashion, foils such as aluminum foil and sheets of high melting plastics such as silicone have been found to be satisfactory. Optionally, the UHMWPE can be hermetically sealed in a wrap material, including evacuation of the container formed by the wrap. In such a situation, it would be feasible to carry out the heating step or protocol in an oven having an ambient atmosphere, without having to use an inert atmosphere. Normally though, a wrap like aluminum foil does not sufficiently exclude oxygen, or if it does at ambient conditions, it tears upon thermal expansion of the polymer at the upper temperature. For this reason an inert atmosphere is preferably provided for the heating step.

In various embodiments when a metal tube is used as a sleeve, the tube is longer than the consolidated polymer, so that the latter fits in the sleeve with overhang of the sleeve on both ends of the polymer in the axial direction. In various embodiments, the sleeve is longer than the polymer by at least 2 cm, at least 5 cm, at least 10 cm, or at least 20 cm.

8. Heat Treating the Consolidated Polymer

The next aspect of heat treating to be described is the heating process or protocol to which the consolidated polymer is subjected in order to provide the cavitation-free pressure treated polymer. Cavitation damage is observed to occur when a heat treatment of the consolidated polymer exceeds about 300° C., and that temperature is also the temperature to which the UHMWPE should be heated to gain tolerance to subsequent melt processing, as described herein. Therefore one aspect of the process is to heat the polymer to a temperature above 300° C. for at least part of the heating protocol. Further, radial pressure should be applied to the polymer for at least part of the time it is being heated above 300° C. In various embodiments, the polymer is pressurized for the entire time the temperature is above 300° C.

As for the time of heating above 300° C., it has been found that exposing the polymer to an above 300° C. oven for a matter of hours is sufficient to mitigate cavitation damage and/or enable subsequent melt processing. Although the invention is not limited to any theory, it is believed that thermal equilibrium in the polymer is reached during prolonged heating in an above 300° C. oven for one, two, three, four, five, or more hours. During this time, the polymer reaches thermal equilibrium, while polymer particles fuse and chain scission occurs. Thus in various embodiments, the current teachings call for heating the polymer itself up to a temperature of above 300° C. In any event, the heating protocol contains at least a brief period of time above 300° C., and preferably an hour or longer. Examples include at least one hour, at least two hours, at least three hours, at least four hours, and at least five hours in an over 300° C. oven. At some point, the heating will be considered too long, when it results in destruction of physical properties of the polymer.

The heating protocol for the consolidated polymer begins at room temperature and includes at least some time spent at or above 300° C. Outside those requirements, many protocols are possible, and some are illustrated in the working examples that follow. FIG. 1 illustrates parameters of the heating protocol. The protocol is defined by various rates of heating; various plateaus of heating, where the temperature is kept constant or within a constant range; at least some time where the temperature is held above 300° C.; and various stages of cooling, with a choice of cooling rate and intermediate plateaus of temperature on the way from above 300° C. back down to room temperature. FIG. 1 illustrates a first heating 10 from room temperature (rt) to a temperature $T_1$. As shown, the temperature $T_1$ is held for a time duration shown by 40, after which a second heating stage 20 brings the oven temperature to a value of $T_2$, which is above 300° C. After a duration 30 of heating at or to a temperature above 300° C., the polymer is cooled in a cooling process 50. Cooling is shown in FIG. 1 as monotonic down to room temperature, but it is understood that cooling, like heating up, can be accomplished in different stages with differing cooling rates, and can be punctuated by plateaus (not shown) similar to what is illustrated in FIG. 1 for the heating up. The heating and cooling stages 10, 20, and 50 of FIG. 1 are characterized by slopes T/t, representing rates of heating and rates of cooling.

In various embodiments, the heating protocol in the heating up stage includes a temperature plateau above or below the melting point. A plateau 40 below the melting temperature and below 300° C. is shown in FIG. 1. The plateau can be held for one hour, two hours, three hours, or longer. Suitable temperatures for a below the melt plateau include about 100° C., about 110° C., about 120° C., about 125° C., about 130° C., and about 135° C. Suitable temperatures for an above the melt plateau include about 150° C., about 160° C., about 170° C., about 180° C., about 190° C., about 200° C., and about 210° C.

Suitable combinations of heating parameters making up the heating protocol are those that lead to cavitation damage in the absence of the radial pressure, but which show decreased cavitation damage when radial pressure is applied during the protocol. It is believed that the heating to above 300° C., above 305° C., above 310° C., above 320° C., above 330° C., above 340° C., or above 350° C., for a suitable period of time, is normally sufficient to show cavitation damage without applying pressure and also mitigation of the damage when pressure is applied. Other parameters of the protocol contribute more or less to other properties such as reduced internal stress and the like.

9. Heat Treating in Subsequent Process Steps

Advantageously, a consolidated UHMWPE heat treated under the pressure conditions described herein, can be subsequently melt processed in various ways. As a result of the pressure treatment, the subsequent melt processing does not negatively affect the physical properties of the treated polymer as much as it would an untreated polymer. Melt processing as used here means heating at or to a temperature above the onset melting point of the UHMWPE. The onset melting temperature is the temperature at which an endotherm is first observed rising from the baseline in a differential scanning calorimetry (DSC) measurement of the UHMWPE. The peak melting temperature is the temperature at the peak of the DSC endotherm.

With conventional consolidated UHMWPE, heating above the onset melting temperature or above the peak melting temperature tends to negatively affect the physical properties of the material, weakening the polymer by lowering the value of physical properties like impact and fatigue strength. On the other hand, heating at or above the onset melting temperature or above the peak melting temperature normally makes reactions go faster, which is advantageous when the goal is to quench free radicals after gamma crosslinking or to diffuse antioxidant into the polymer interior after doping or exposure to antioxidant.

In the following description, the heating steps can be carried out conventionally below the peak melting temperature or below the onset melting temperature. But when the UHMWPE is first heat treated with radial constraint as described herein, the heating steps can also be carried out above the onset melting temperature. This is melt processing.

9.1. Melt Processing Crosslinked Polymers

Melt processing can be applied on crosslinked polymers. In various embodiments, crosslinking is accomplished by exposing a polymeric bulk material to irradiation, wherein the polymeric bulk material has been temperature and pressure treated as described herein. Non-limiting examples of irradiation for crosslinking the polymers include electron beam, x-ray, and γ-irradiation. In various embodiments, γ-irradiation is preferred because the radiation readily penetrates the bulk material. Electron beams can also be used to irradiate the bulk material. With e-beam radiation, the penetration depth depends on the energy of the electron beam, as is well known in the art.

In various embodiments, the polymeric bulk material is irradiated in a solid state at a dose of about 0.01 to about 100 MRad (about 0.1 to about 1000 kGy), preferably from about 1 to about 20 MRad, using methods known in the art, such as exposure to gamma emissions from an isotope such as $^{60}$Co. In various embodiments, irradiation for crosslinking is carried out at a dose of about 1 to about 20, preferably about 5 to about 20 MRad. In a non-limiting embodiment, irradiation is to a dose of approximately 10 MRad. If desired, the bulk material prepared by the methods described herein are irradiated at a temperature above the onset melting temperature, or above the peak melting temperature of the polymer.

Irradiation of the polymeric bulk material is usually accomplished in an inert atmosphere or vacuum. In one example, the polymeric bulk material is packaged in an oxygen impermeable package during the irradiation step. Inert gases, such as nitrogen, argon, and helium may also be used. When vacuum is used, the packaged material may be subjected to one or more cycles of flushing with an inert gas and applying the vacuum to eliminate oxygen from the package. Examples of package materials include metal foil pouches such as aluminum or Mylar® coating packaging foil, which are available commercially for heat sealed vacuum packaging. Irradiating the polymeric bulk material in an inert atmosphere reduces the effect of oxidation and the accompanying chain scission reactions that can occur during irradiation. Oxidation caused by oxygen present in the irradiation atmosphere is generally limited to the surface of the polymeric material. In general, low levels of surface oxidation can be tolerated, as the oxidized surface can be removed during subsequent machining.

Irradiation such as γ-irradiation can be carried out on polymeric material at specialized installations possessing suitable irradiation equipment. When the irradiation is carried out at a location other than the one in which further heating, doping, or machining operations are to be carried out, the irradiated bulk material is conveniently left in the oxygen impermeable packaging during shipment to the site for further operations.

The crosslinked polymer can be further treated in a variety of ways that take advantage of the heat treatment with radial constraint described herein.

In one embodiment, the crosslinked polymer, which is prepared for example by irradiating a pressure treated UHMWPE described herein, is subject to subsequent heat treatment to reduce the level of free radicals in the crosslinked polymer. In various embodiments, the crosslinked polymer is subjected to heat treatment below the melt temperature, such as at about 135° C. and lower to partially reduce the free radicals. In other embodiments, the crosslinked polymer is heated above the melting temperature (i.e., melt processing above the onset melting temperature or above the peak melting temperature). In other embodiments, heat treatment is considered melt processing if the treatment is at a temperature about 135° C. or higher, about 137° C. or higher, about 140° C. or higher, or about 150° C. or higher. In this way the present teachings provide a preformed material for subsequent production of a bearing component of a medical implant, the material being a polyethylene crosslinked by irradiation and then thermally treated by either annealing below the melting point or by heat above the melting point, a process that can be called remelting. Further details of these embodiments can be found in U.S. Pat. No. 6,228,900, Shen et al., issued May 8, 2001 and hereby incorporated by reference.

9.2. Deformation Methods

In another embodiment, the crosslinked polymer is subjected to a deformation step carried out either below the melting point in a solid state process or above the onset melting temperature in a melt process. An exemplary process involves the steps of: a) irradiating polyethylene, at a dose level between about 1 and about 10,000 kGy; b) heating the irradiated polyethylene to a compression deformable temperature; c) mechanically deforming the polyethylene from step b); and d) cooling the polyethylene for subsequent processing to form an artificial joint bearing component. Any of steps a), b), and c) can be carried out at a temperature below the melting point of the polyethylene or at a temperature above the onset melting temperature, such as at a temperature about 135° C. or higher, about 140° C. or higher, or about 150° or higher. In various non-limiting embodiments, the mechanical deformation mode in step c) is selected from channel flow, uniaxial compression, biaxial compression, oscillatory compression, uniaxial tension, biaxial tension, ultra-sonic oscillation, bending, plane stress compression (channel die). Further details are provided in U.S. Pat. No. 8,076,387, Muratoglu et al., issued Dec. 13, 2011, the entire disclosure of which is hereby incorporated by reference. In other embodiments, the mechanical deformation mode is triaxial compression.

In a particular embodiment, mechanical deformation is accomplished by extruding the heat treated polymer of step b), using an increasing die, a decreasing die, or an isoareal die. Extrusion subjects the UHMWPE to a triaxial compression. In various embodiments, the crosslinked material is heated to a compression deformable temperature above the melting point of the polymer (e.g., from the onset melting temperature to about 80° C. higher than the onset melting temperature) or to a compression deformable temperature below the onset melting temperature (e.g., to a temperature between the onset melting temperature and 50° C. below the melting temperature).

In an exemplary embodiment, when the crosslinked bulk material is at a compression deformable temperature, pressure is applied in step c) to the bulk material to induce a dimensional change in a direction orthogonal to the axial direction. The dimensions of the bulk material change in response to the application of pressure, which results in "working" of the crosslinked material with material flow of the heated bulk material. Force (or, equivalently, pressure, which is force divided by area) is applied so that at least one component of the dimension change is orthogonal to the axial direction of the bulk material, with the dimensional change being either positive or negative. To illustrate, for cylindrical rods and other bulk materials that have a constant cross section along the axial direction of the bulk material, compression force is applied in a direction perpendicular to the axial direction in order to decrease a transverse dimension.

Any suitable methods can be used to apply compression force in a direction orthogonal to the axial direction. Non-limiting examples include extrusion through dies and the use of rollers, compression plates, clamps, and equivalent means.

Advantageously, the deformation temperature can be above the melting temperature, which not only results in faster reaction times, but also tends to eliminate free radicals more completely, leading to oxidation resistant materials.

Following the deformation step c), in various embodiments the polyethylene is further processed in a further series of steps to provide a bearing component. These steps involve cooling the deformed polymer with or without maintaining deformation pressure during cooling, subsequently heat treating the cooled polymer to reduce internal stresses and/or to permit recovery of shape from before the deformation, and are then followed by various machining or sterilization steps to make a bearing component for in vivo use. Details of these steps, as well as those of steps a), b), and c) above, are given in U.S. Pat. No. 7,462,318, Schroeder et al., issued Dec. 9, 2008, and U.S. Pat. No. 7,547,405, Schroeder et al., issued Jun. 16, 2009, the full disclosures of which are incorporated by reference.

9.3. Doping Methods

In other embodiments, the heat and pressure treated UHMWPE is subsequently doped with antioxidant, with or without crosslinking. Melt processing accelerates the doping and homogenizing steps of these methods. A bulk material is provided as a UHMWPE prepared using the pressure heat treatment and crosslinked or not with an irradiation such as gamma irradiation, as described above.

In various embodiments, an antioxidant composition is doped into the bulk material to provide antioxidant at an effective level, especially throughout the whole bulk of the components. Preferably, the methods provide a rapid method of doping to provide effective antioxidant levels. In this regard, in one embodiment, advantage is taken of the preform shape and its close approximation to the final dimensions of the component being made. In various embodiments, the preform is only about 1 to about 15 mm, about 1 to about 10 mm, or about 1 to about 4 mm larger in any dimension than the ultimate component, the preforms can be doped in a reasonable amount of time to provide measurable levels of antioxidant throughout the bulk of the component. Then, any surface of the doped preform that is higher in antioxidant than the saturation value can be cut off to "expose" a surface having a non-eluting value of antioxidant. In various embodiments, the shape of the preform and the time of doping and homogenizing are chosen to provide the desired level of antioxidant.

Antioxidant compositions useful herein contain one or more antioxidant compounds. Non-limiting examples of antioxidant compounds include tocopherols such as vitamin E, carotenoids, triazines, vitamin K, and others. Preferably, the antioxidant composition comprises at least about 10% of one or more antioxidant compounds. In various embodiments, the antioxidant composition is at least about 50% by weight antioxidant up to and including 100%, or neat antioxidant.

As used here, the term vitamin E is used as a generic descriptor for all tocol and tocotrienol derivatives that exhibit vitamin E activity, or the biological activity of α-tocopherol. Commercially, vitamin E antioxidants are sold as vitamin E, α-tocopherol, and related compounds.

Carotenoids having antioxidant properties are among compounds suitable for the antioxidant compositions of the invention. Non-limiting examples of the invention include vitamin A and beta-carotene.

Other antioxidants include vitamin C (ascorbic acid) and its derivatives; vitamin K; gallate esters such propyl, octyl, and dodecyl; lactic acid and its esters; tartaric acid and its salts and esters; and ortho phosphates. Further non-limiting examples include polymeric antioxidants such as members of the classes of phenols; aromatic amines; and salts and condensation products of amines or amino phenols with aldehydes, ketones, and thio compounds. Non-limiting examples include para-phenylene diamines and diaryl amines.

Antioxidant compositions preferably have at least about 10% by weight of the antioxidant compound or compounds described above. In preferred embodiments, the concentration is about 20% by weight or more or about 50% by weight or more. In various embodiments, the antioxidant compositions are provided dissolved in suitable solvents. Solvents include organic solvents and supercritical solvents such as supercritical carbon dioxide. In other embodiments, the antioxidant compositions contain emulsifiers, especially in an aqueous system. An example is vitamin E (in various forms such as α-tocopherol), water, and suitable surfactants or emulsifiers. In a preferred embodiment, when the antioxidant compound is a liquid, the antioxidant composition consists of the neat compounds, or 100% by weight antioxidant compound.

During the doping process, the bulk material is exposed to antioxidant in a doping step followed by heat treatment or homogenization out of contact with the antioxidant. Total exposure time of the bulk material to the antioxidant is selected to achieve suitable penetration of the antioxidant. In various embodiments, total exposure time is at least several hours and preferably greater than or equal to one day (24 hours).

In various embodiments, a doping step is followed by a subsequent annealing or "homogenization" step. In one aspect, it is desirable to provide methods of achieving a suitable level of antioxidant in the interior or inner portions of the bulk material, while avoiding excess antioxidant at the outer surface. During the homogenization step, the antioxidant continues to diffuse into the interior of the bulk material. In various embodiments, the total time of annealing or homogenization is at least several hours and more preferably more than one day. For example, while there is no particular upper limit, homogenization is preferably carried out for at least an hour after doping, and typically for a period of from about 1 to about 400 or about 600 hours. Depending on the size of the part, the post doping heating is carried out for a period of from about 10 to about 14 days, or for from about 11 to about 17 days, by way of non-limiting example. In the case of vitamin E, the vitamin E index is preferably greater than or equal to about 0.01 in the center and throughout the bulk of the component, while being less than the saturation level on the outside of surface. The saturation level on the outside surface is normally taken to be the saturation level of the antioxidant in the component at body temperature, which is the approximate temperature to which the implant will be exposed when implanted. Body temperature takes on a range of values, but "normal" human body temperature is commonly referred to as about 98.6° F., which converts to about 37° C.

The temperature at which the exposing (doping) and annealing (homogenization) steps are carried out is preferably as high as possible without deleteriously affecting the physical properties of the doped polymer. In various embodiments, the temperature of exposure and annealing is carried out about or above 30° C., about or above 50° C., about or above 80° C., about or above 100° C., and about or above 120° C. Preferably, the temperature is below the melting point of the bulk polymer. Exemplary temperatures, especially for the case of UHMWPE, include less than or about 135° C. and less than or about 130° C. In one embodiment, UHMWPE is exposed and annealed (homogenized) at a temperature of about 130° C.

Advantageously, one or both of the doping and annealing (or homogenization) steps, can also be carried out above the onset melting temperature, above the peak melting temperature, about 135° C. or above, about 137° C. or above, about 140° C. or above, or about 150° C. or above. This is particularly useful when the material is to be used as a bearing component for a medical implant.

The doping and homogenization steps can be repeated as desired to achieve suitable dispersion of the antioxidant through the bulk preform.

10. Production of Implant Components

After a consolidated UHMWPE is pressure treated according to the above teachings, and the pressure treated UHMWPE is further processed with one or more subsequent steps of crosslinking, doping, heat treating, deformation, and annealing steps as detailed above, the resulting UHMWPE is machined or otherwise processed into the shape of the desired bearing component. After machining, the parts can be subjected to conventional sterilization and packaging.

Embodiments of the present technology are further illustrated through the following non-limiting examples.

EXAMPLES

Example 1

Heating at 300° C., without Radial Constraint

In a laboratory oven, the following UHMWPE consolidated bars were placed on the top shelf, five GUR 1050 bars of diameter 3.75 inches and two GUR 1020 bars of diameter 3.25 inches; on the second shelf, five GUR 1020 bars of diameter 3 inches and three GUR 1020 bars of diameter 3.25 inches; and on the third shelf, five GUR 1050 bars of 3-inch diameter and five GUR bars of 2.625 inch diameter.

The consolidated UHMWPE bars were heated with the following oven program.

Purge with nitrogen: 30 min at 25°
Ramp to 40° C. over 30 minutes
Hold at 40° C. for 52 hours (so it starts Sunday night)
Ramp to 120° C. over 2 hours
Hold at 120° C. for 8 hours
Ramp to 300° C. over 2 hours
Hold at 300° C. over 10 hours
Ramp down to 40° C. over 2 hrs 3 mins (~2° C./min)
Hold at 40° C. for 6 hours
Cool to room temperature The bars were removed from the oven after the final cooling step and cut in half lengthwise to find cavitation. No evidence of cavitation found in any of the bar sizes tested. Measurements of vinylene index (VI) via FTIR made from the outside diameter to the center of the bar revealed no significant increase in vinylene groups. For generation of a vinylene index, the peak areas at 880-920 was normalized to a peak at 1850-1985.

Tensile specimens were machined from the center of the 3¾ inch bars (Type 4, 1.5 mm thick) and tested for yield strength (YS), ultimate tensile strength (UTS) and percent elongation (% E). The yield strength and ultimate tensile strengths were similar to those of non-treated UHMWPE tensile properties, but the % elongation was elevated.

Example 2

Heating at 320° C. without Radial Constraint

Five GUR 1020 bars of diameter 3¾ inch (minimum length of 5 inches) and five pieces of GUR 1020 one inch thick (i.e., disks of diameter 3¾ inches and length 1 inch) were subjected to the following heating protocol in a laboratory oven.

1. Purge with nitrogen gas at room temperature (30 min)
2. Ramp to 40° C. over 30 min
3. Hold at 40° C. for a time determined by desired completion time
4. Ramp to 120° C. over 2 hrs
5. Hold at 120° C. for 8 hours
6. Heat to 320° C. over 2 hrs 15 mins
7. Hold at 320° C. for 10 hours
8. Ramp down to 40° C. at 2° C./min (2 hrs 20 min)
9. Hold at 40° C. for 6 hours (min)
10. End Parts were cut in half (lengthwise) and cavitations were noted.

Example 3

Pressure Heat Treating with Isostatic Pressure

A one-inch thick 3¾ inch diameter UHMWPE puck was placed in a pressure vessel where the temperature and pressure were increased to 320 C and 15,000 psi respectively. The temperature and pressure was held for 10 hours. The temperature was cooled to 40 C. The pressure was allowed to drop with the temperature to around 7,000 psi.

Isostatic pressure did not prevent cavitation. Instead of relatively large, elliptical voids, the bulk of the isostatically pressurized puck was riddled with small voids that made the polyethylene look porous like a kitchen sponge.

Example 4

Radial Constraint to Reduce Cavitation

This demonstrates reducing cavitation by allowing the thermal expansion of the polyethylene to pressurize itself circumferentially. This was achieved by wrapping a 3-inch diameter bar of UHMWPE having a length equal to at least twice the diameter of the bar in silicone rubber and sliding it into a 3¼ inch ID steel tube. A control specimen was used (not in a tube). The temperature cycle of Example 2 was utilized. At the end of the cycle, the two bars were sectioned. Cavitation was found in the control specimen, but not in the constrained bar.

Example 5a

Cavitation not Observed with 3-Inch UHMWPE Bar in an Experiment without Duplicates The procedure of Example 4 was repeated with a 3-inch UHMWPE bar, using aluminum foil instead of silicone. Additionally, the cooling cycle was changed from 2 hours 20 minutes to 12 hours (320° C. to 70° C.). In this trial, no cavitation was found in either the constrained or non-constrained (control) bar. This was an n=1 experiment.

Example 5b

Radial Constraint of 3.75-Inch Diameter Bars

Three UHMWPE GUR 1020 bars having a diameter of 3¾ inches were cut into lengths of 7 inches to 10 inches. Three bars were wrapped in aluminum foil and inserted into steel tubes (4-inch outer diameter, 3.87-inch inner diameter, 12-inch length). The 3 bars in tubes and 3 control bars of the same diameter were placed in an inert gas oven. The oven program was:
1. Ramp to 120° C. over 2 hours
2. Hold at 120° C. for 8 hours
3. Heat to 320° C. over 2 hours 15 minutes
4. Hold at 320° C. for 10 hours
5. Ramp to 40° C. over 12 hours
6. Hold at 40° C. for 6 hours
7. End After sectioning bars, cavitations were observed in all 3 of the control bars along with significant deformation due to flow of the polyethylene. When the radially constrained bars were sectioned, there was no evidence of cavitation. The bars were sectioned in quarters exposing the center of the bar where the cavitations form.

This study shows that adding radial constraint during the heating process either prevents cavities from forming or aids in the gas evacuation process. In an isostatic pressure situation, the gas formed during the process has nowhere to go. By leaving the ends of the tubes open, the pressure generated by the expansion may help push the gas that forms from the system.

Besides producing a bar without cavities, radically constraining the bar prevents flow of the polyethylene, forcing it to maintain its shape. For manufacturability, it is an advantage for the material to remain round.

Conclusion

Heating under radial constraint prevents or removes cavitations during the high temp melt process and allows the material to maintain its shape.

Cavities that form above 300° C. in larger dimensioned pieces limited the viability of a process involving heating at about 300° C. or higher. Heating under radial constraint allows this process to be completed on larger diameter barstock.

Example 6

Physical Properties of UHMWPE Heated with Radial Constraint

The constrained bars from Example 5b were used as the raw material for making 10 tensile bars, with tensile testing carried out per ASTM D638. The average ultimate tensile strength measured on the ten bars was 48.1 MPa, with a standard deviation of 1.3; the average yield strength was 27.1 MPa (std. dev. 0.4); and the average % elongation was 777.9% (std. dev. 34.2) The yield strength and the % elongation were higher than that of the non-heat treated UHMWPE. (GUR 1020 UHMWPE typically has a yield strength of around 24 MPa and a % elongation around 350%.) The increases in these two parameters are consistent with the expected output of the heat treatment process. This indicates that the addition of radial constraint to the heat treatment of consolidated polyethylene did not deleteriously affect the properties of the polyethylene.

NON-LIMITING DISCUSSION OF TERMINOLOGY

The headings (such as "Introduction" and "Summary") and sub-headings used herein are intended only for general organization of topics within the present disclosure, and are not intended to limit the disclosure of the technology or any aspect thereof. In particular, subject matter disclosed in the "Introduction" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The description and specific examples, while indicating embodiments of the technology, are intended for purposes of illustration only and are not intended to limit the scope of the technology. Equivalent changes, modifications and variations of specific embodiments, materials, compositions and methods may be made within the scope of the present technology, with substantially similar results. Moreover, recitation of multiple embodiments having stated features is not intended to exclude other embodiments having additional features, or other embodiments incorporating different combinations of the stated features. For example, a component which may be A, B, C, D or E, or combinations thereof, may also be defined, in some embodiments, to be A, B, C, or combinations thereof. Specific examples are provided for illustrative purposes of how to make and use the compositions and methods of this technology and, unless explicitly stated otherwise, are not intended to be a representation that given embodiments of this technology have, or have not, been made or tested.

As used herein, the words "prefer" or "preferable" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components or process steps, the present technology also specifically includes embodiments consisting of, or consisting essentially of, such materials, components or processes excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein. Further, as used herein the term "consisting essentially of" recited materials or components envisions embodiments "consisting of" the recited materials or components.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters.

As referred to herein, ranges are, unless specified otherwise, inclusive of endpoints and include disclosure of all distinct values and further divided ranges within the entire range. Thus, for example, a range of "from A to B" or "from about A to about B" is inclusive of A and of B. Further, the phrase "from about A to about B" includes variations in the values of A and B, which may be slightly less than A and slightly greater than B; the phrase may be read be "about A, from A to B, and about B." Disclosure of values and ranges of values for specific parameters (such as temperatures, molecular weights, weight percentages, etc.) are not exclusive of other values and ranges of values useful herein.

It is also envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

We claim:

1. A method comprising:
    inserting a consolidated UHMWPE, in the form of a cylindrical bar of diameter from 2 inches to 4 inches, into a rigid sleeve, wherein the sleeve has a diameter greater than that of the UHMWPE bar, and wherein upon insertion, an inner wall of the sleeve contacts some but not all of the UHMWPE bar,
    heating the UHMWPE in the sleeve to a temperature of 330° C. or higher, wherein the sleeve is dimensioned so that the heated UHMWPE thermally expands and contacts the entire inner wall of the sleeve during the heating so that the sleeve provides radial pressure to the heated UHMWPE and simultaneously leaves a longitudinal direction of the heated UHMWPE unconstrained,
    cooling the heated UHMWPE, to provide a UHMWPE product, wherein during the cooling, the temperature of the UHMWPE is lowered to such an extent that the UHMWPE shrinks and loses contact with the inner wall of the sleeve, so that it can be removed from the sleeve, and
    removing the UHMWPE from the sleeve,
    wherein the UHMWPE product has less cavitation than a UHMWPE product made by a corresponding method free of the radial pressure.

2. The method according to claim 1, wherein the sleeve is longer than the consolidated UHMWPE, and the consolidated UHMWPE fits wholly within the sleeve during the heating step.

3. The method according to claim 1, wherein the heating is carried out in an inert atmosphere.

4. The method according to claim 1, wherein the heating is carried out in a vacuum.

5. The method according to claim 1, wherein the heating is carried out in nitrogen.

6. The method according to claim 1, wherein the heating is carried out by bringing the oven to a temperature of 330° C. or higher and holding at 330° C. or higher for an hour or longer.

7. The method according to claim 6, wherein the temperature is held at 330° C. or higher for about 5 hours or longer.

8. The method according to claim 1, wherein the UHMWPE is heated in the sleeve to a temperature of 350° C. or higher.

9. The method according to claim 1, wherein the consolidated UHMWPE has a diameter of about 3.75 inches and the sleeve has an inner diameter of about 3.875 inches.

10. The method according to claim 1, wherein the UHMWPE product after cooling is characterized by diminished cavitation compared to that of a consolidated UHMWPE treated in the same way but without the sleeve.

11. A process for reducing or eliminating cavitation in a heat-treated UHMWPE product, the method comprising:
    heating a consolidated UHMWPE at a temperature of 330° C. or higher while applying transverse pressure on the UHMWPE and simultaneously leaving an axial direction of the UHMWPE unconstrained, to provide the heat-treated UHMWPE product;
    wherein the heat-treated UHMWPE product has less cavitation than a heat-treated UHMWPE product made by a corresponding method free of the transverse pressure.

12. The process according to claim 11, wherein the consolidated UHMWPE is in the form of a cylindrical bar.

13. The process according to claim 11, wherein pressure is applied by inserting the consolidated UHMWPE into a sleeve, and heating to 330° C. or higher with the UHMWPE in the sleeve.

14. The process according to claim 13, wherein the consolidated UHMWPE is enclosed in a wrap material before insertion into the sleeve.

15. The process according to claim 13, wherein the transverse pressure is applied by contact of the consolidated UHMWPE with the inner wall of the sleeve, as the consolidated UHMWPE thermally expands in the axial direction as a result of the heating.

16. The process according to claim 11, wherein the pressure is applied only in the transverse direction.

17. The process according to claim 11, wherein the heating is carried out in an inert atmosphere.

18. A method of producing wear resistant UHMWPE for use in bearing components of medical implants, comprising:
    heat treating a consolidated UHMWPE by heating to 330° C. or higher while applying radial pressure and simultaneously leaving a longitudinal direction of the consolidated UHMWPE unconstrained, to form a UHMWPE product, wherein the UHMWPE product has less cavitation than a UHMWPE product made by a corresponding heat treatment free of the radial pressure;
    crosslinking the UHMWPE product; and subjecting the crosslinked UHMWPE to heating below its melting temperature or above its melting temperature, to provide the wear resistant UHMWPE.

19. The method of claim 18, wherein the subjecting the crosslinked UHMWPE to heating comprises heating the crosslinked UHMWPE to a compression deformable temperature and then deforming the UHMWPE, to provide the wear resistant UHMWPE.

20. The method according to claim 19, wherein the deforming is accomplished by extruding the heat-treated UHMWPE through a die.

21. A method of making an oxidation resistant UHMWPE for use in making a bearing component for a medical implant, the method comprising:
heat treating a consolidated UHMWPE by heating to 330° C. or higher while applying radial pressure and simultaneously leaving a longitudinal direction of the consolidated UHMWPE unconstrained, to form a UHMWPE product, wherein the UHMWPE product has less cavitation than a UHMWPE product made by a corresponding heat treatment free of the radial pressure;
doping the UHMWPE product with an antioxidant; and
homogenizing the doped UHMWPE by heating above room temperature, to provide the oxidation resistant UHMWPE.

22. The method according to claim 21, comprising homogenizing at a temperature above the onset melting temperature of the UHMWPE.

23. The method according to claim 22, comprising doping at a temperature above the onset melting temperature of the UHMWPE.

24. The method according to claim 21, further comprising crosslinking the UHMWPE product before the doping step.

25. A method of processing UHMWPE for subsequent use in an artificial joint bearing component, comprising:
heat treating a consolidated UHMWPE by heating to 330° C. or higher while applying radial pressure and simultaneously leaving a longitudinal direction of the consolidated UHMWPE unconstrained, to form a UHMWPE product, wherein the UHMWPE product has less cavitation than a UHMWPE product made by a corresponding heat treatment free of the radial pressure;
crosslinking the UHMWPE product; and
mechanically deforming the crosslinked UHMWPE to reduce the concentration of free radicals resulting from the crosslinking, to provide the UHMWPE for subsequent use in the artificial joint bearing component.

26. The method according to claim 25, wherein mechanically deforming comprises heating the crosslinked UHMWPE to a compression deformable temperature and applying deformation pressure.

27. The method according to claim 25, wherein deforming comprises extruding through a die.

28. The method according to claim 25, wherein the deforming step comprises triaxial compression.

* * * * *